United States Patent
Huang

(10) Patent No.: US 11,457,138 B2
(45) Date of Patent: Sep. 27, 2022

(54) METHOD AND DEVICE FOR IMAGE PROCESSING, METHOD FOR TRAINING OBJECT DETECTION MODEL

(71) Applicant: GUANGDONG OPPO MOBILE TELECOMMUNICATIONS CORP., LTD., Guangdong (CN)

(72) Inventor: Haidong Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 250 days.

(21) Appl. No.: 16/857,936

(22) Filed: Apr. 24, 2020

(65) Prior Publication Data

US 2020/0412940 A1    Dec. 31, 2020

(30) Foreign Application Priority Data

Jun. 28, 2019 (CN) .......................... 201910576414.1

(51) Int. Cl.
   *G06K 9/00*     (2022.01)
   *H04N 5/232*    (2006.01)
   (Continued)

(52) U.S. Cl.
   CPC ......... *H04N 5/23218* (2018.08); *G06T 7/521* (2017.01); *H04N 5/2226* (2013.01);
   (Continued)

(58) Field of Classification Search
   CPC ............. H04N 5/23218; H04N 5/2226; H04N 5/23222; H04N 5/265; G06T 7/521;
   (Continued)

(56) References Cited

U.S. PATENT DOCUMENTS 8,593,534 B2   11/2013   Gardiner
10,452,893 B2  10/2019   Wang
(Continued)

FOREIGN PATENT DOCUMENTS

CN    1973231 A     5/2007
CN    102800085 A   11/2012
(Continued)

OTHER PUBLICATIONS

Wang et al. (Global Gaussian Distribution Embedding Network and Its Application to Visual Recognition) (Year: 2017).*
(Continued)

*Primary Examiner* — Stephen P Coleman

(57) ABSTRACT

A method and device for image processing, a method for training an object detection model are provided in the present disclosure. In the method for image processing, a visible light image is acquired. A central weight map corresponding to the visible light image is generated. Weight values represented by the central weight map gradually decrease from a center to an edge of a visible light image. The visible light image and the central weight map are inputted into an object detection model to obtain an object region confidence map. The object detection model is a model obtained by training according to multiple set of training data, each set of which includes a visible light image, a central weight map and a corresponding labeled object mask pattern for a same scenario. A target object in the visible light image is determined according to the object region confidence map.

20 Claims, 11 Drawing Sheets

(51) Int. Cl.
*G06T 7/521* (2017.01)
*H04N 5/222* (2006.01)
*H04N 5/265* (2006.01)

(52) U.S. Cl.
CPC ......... *H04N 5/23222* (2013.01); *H04N 5/265* (2013.01); *G06T 2207/20081* (2013.01)

(58) Field of Classification Search
CPC . G06T 2207/20081; G06T 7/11; G06T 7/194; G06T 7/66; G06T 2207/10004; G06T 2207/10024; G06K 9/00; G06K 9/6289; G06V 10/82
USPC ........................................................ 382/103
See application file for complete search history.

(56) References Cited

U.S. PATENT DOCUMENTS

| | | | | |
|---|---|---|---|---|
| 2007/0110422 | A1* | 5/2007 | Minato | ............. H04N 5/23219 396/14 |
| 2018/0018503 | A1 | 1/2018 | Wang | |
| 2018/0278737 | A1 | 9/2018 | Posa | |
| 2020/0005022 | A1 | 1/2020 | Wang | |

FOREIGN PATENT DOCUMENTS

| | | |
|---|---|---|
| CN | 104268537 A | 1/2015 |
| CN | 106157281 A | 11/2016 |
| CN | 205883405 U | 1/2017 |
| CN | 106815842 A | 6/2017 |
| CN | 106886999 A | 6/2017 |
| CN | 104469167 B | 10/2017 |
| CN | 107403430 A | 11/2017 |
| CN | 106686308 B | 2/2018 |
| CN | 108024065 A | 5/2018 |
| CN | 108154465 A | 6/2018 |
| CN | 108170817 A | 6/2018 |
| CN | 108171212 A | 6/2018 |
| CN | 108460389 A | 8/2018 |
| CN | 108664974 A | 10/2018 |
| CN | 108900778 A | 11/2018 |
| CN | 109089047 A | 12/2018 |
| CN | 105847664 B | 1/2019 |
| CN | 109167910 A | 1/2019 |
| CN | 109272016 A | 1/2019 |
| CN | 109859233 A | 6/2019 |
| CN | 110276767 A | 9/2019 |
| WO | 2017096753 A1 | 6/2017 |

OTHER PUBLICATIONS

First Office Action of the Indian application No. 202014026788, dated Aug. 4, 2021.
Zheng Guping et al. "Semantic Segmentation of Multi-Scale Fusion Aerial Image Based on Attention Mechanism" Journal of Graphics, vol. 39 No. 6, Dec. 2018.
Lu Hongchao et al. "Semantic Image Segmentation Based on Attentions to Intra Scales and Inner Channels" 2018 International Joint Conference on Neural Networks (IJCNN).
First Office Action of the Chinese application No. 201910576414.1, dated Feb. 3, 2021.
International Search Report in the international application No. PCT/CN2020/090332, dated Aug. 13, 2020.
English translation of the Written Opinion of the International Search Authority in the international application No. PCT/CN2020/090332, dated Aug. 13, 2020.
Wang Qilong et al: "G2DeNet: Global Gaussian Distribution Embedding Network and Its Application to Visual Recognition", 2017 IEEE Conference on Computer Vision and Pattern Recognition (CVPR), IEEE Computer Society, US, Jul. 21, 2017 (Jul. 21, 2017), pp. 6507-6516, XP033250015, ISSN: 1063-6919, DOI: 10.1109/CVPR.2017.689 [retrieved on Nov. 6, 2017], *1.Introduction; figure 1* *3.Global Gaussian Distribution Embedding Network*.
Zia Saman et al: "RGB-D Object Recognition Using Deep Convolutional Neural Networks", 2017 IEEE International Conference on Computer Vision Workshops (ICCVW), IEEE, Oct. 22, 2017 (Oct. 22, 2017), pp. 887-894, XP033303534, DOI: 10.1109/ICCVW.2017.109 [retrieved on Jan. 19, 2018], * p. 889-p. 891 *.
Supplementary European Search Report in the European application No. 20175489.2, dated Nov. 6, 2020.

* cited by examiner

METHOD AND DEVICE FOR IMAGE PROCESSING, METHOD FOR TRAINING OBJECT DETECTION MODEL

CROSS-REFERENCE TO RELATED APPLICATIONS

This application claims priority to Chinese Patent Application No. 201910576414.1, entitle "METHOD AND DEVICE FOR IMAGE PROCESSING, ELECTRONIC DEVICE, AND COMPUTER-READABLE STORAGE MEDIUM", filed on Jun. 28, 2019, the entire contents of which are incorporated herein by reference.

BACKGROUND

With the development of video and image technologies, people are gradually used to shoot images or videos through image acquisition devices such as cameras of electronic devices, so as to record various information. A camera is required to detect an object sometimes in an image acquisition process. It is impossible to accurately detect an object in an image in a conventional object detection manner.

SUMMARY

The embodiments of the disclosure provide a method and device for image processing, a method for training an object detection model.

According to at least some embodiments, a method for image processing is provided, which includes operations as follows.

A visible light image is acquired.

A central weight map corresponding to the visible light image is generated. Weight values represented by the central weight map gradually decrease from a center to an edge of the visible light image.

The visible light image and the central weight map are inputted into an object detection model, to obtain an object region confidence map. The object detection model is a model obtained by training according to multiple sets of training data, and each set of training data includes a visible light image, a central weight map and a corresponding labeled object mask pattern for a same scenario.

At least one target object in the visible light image is determined according to the object region confidence map.

According to at least some embodiments, a method for training an object detection model is provided, which includes operations as follows.

Multiple sets of training data are acquired. Each set of training data includes visible light image, a depth image and a corresponding labeled object mask pattern for a same scenario.

A central weight map corresponding to the visible light image is generated. Weight values represented by the central weight map gradually decrease from a center to an edge of the visible light image.

Training is performed by taking the visible light image, the depth image and the central weight map as an input of an object detection model including an initial network weight, and taking the labeled object mask pattern as a ground truth outputted by the object detection model including the initial network weight, to obtain a target network weight of the object detection model.

According to at least some embodiments, a device for image processing is provided, which includes a processor, and a memory having stored thereon a computer program. The computer program, when executed by the processor, enables the processor to implement operations as follows.

A visible light image is acquired.

A central weight map corresponding to the visible light image is generated. Weight values represented by the central weight map gradually decrease from a center to an edge of the visible light image.

The visible light image and the central weight map are inputted into an object detection model to obtain an object region confidence map. The object detection model is a model obtained by training according to multiple sets of training data, and each set of training data includes a visible light image, a corresponding central weight map and a corresponding labeled object mask pattern for the same scenario.

At least one target object in the visible light image is determined according to the object region confidence map.

BRIEF DESCRIPTION OF THE DRAWINGS

In order to describe the technical solutions in the embodiments of the disclosure or a conventional art more clearly, the drawings required to be used in descriptions about the embodiments or the conventional art will be simply introduced below. It is apparent that the drawings described below only illustrate some embodiments of the disclosure. Other drawings may further be obtained by those skilled in the art according to these drawings without creative work.

DETAILED DESCRIPTION

Figure 1:
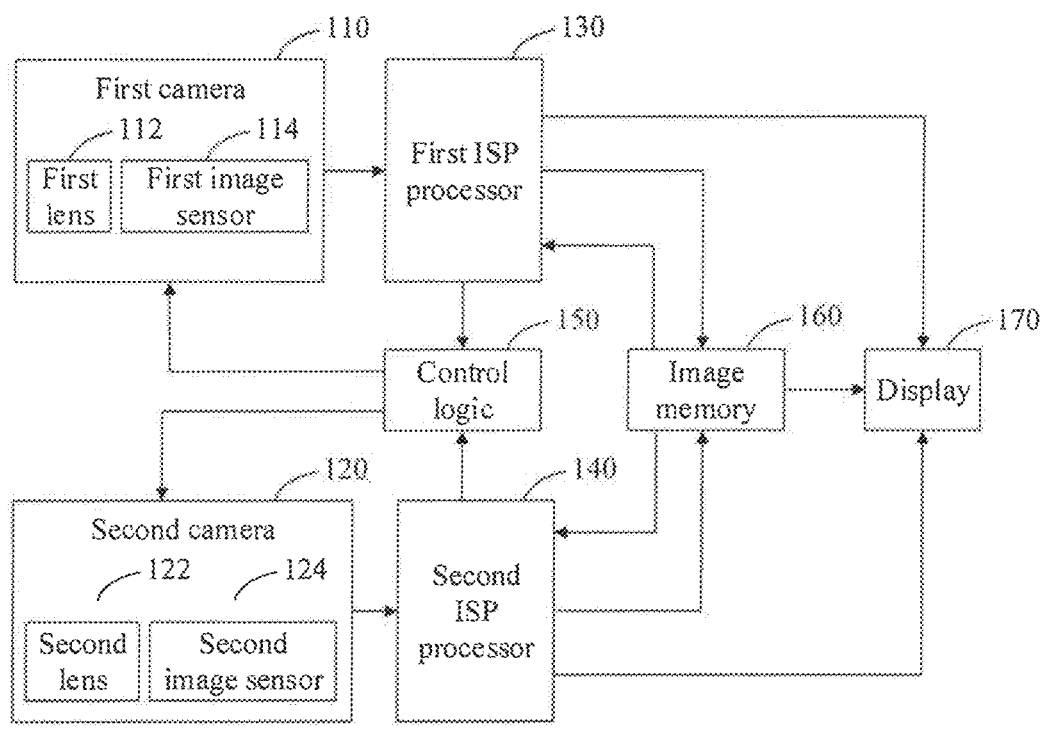
FIG. 1 is an internal structural block diagram of an electronic device according to at least some embodiments.

For making purposes, technical solutions and advantages of the disclosure clearer, the disclosure will further be described below in conjunction with the drawings and the embodiments in detail. It is to be understood that specific embodiments described here are only used to explain the disclosure rather than limiting the disclosure.

According to at least some embodiments of the disclosure, a method for image processing, a method for training an object detection model, a device for image processing, a device for training an object detection model, an electronic device and a non-transitory computer-readable memory medium are provided.

Solution 1: A method for image processing, comprising:

acquiring a visible light image;

generating a central weight map corresponding to the visible light image, weight values represented by the central weight map gradually decreasing from a center to an edge;

inputting the visible light image and the central weight map into an object detection model to obtain an object region confidence map, wherein the object detection model is a model obtained by training according to a visible light image, a central weight map and a corresponding labeled object mask pattern for a same scenario; and determining a target object in the visible light image according to the object region confidence map.

Solution 2: The method of solution 1, wherein determining the target object in the visible light image according to the object region confidence map comprises:

processing the object region confidence map to obtain an object mask pattern;

detecting the visible light image to determine a highlight region in the visible light image; and determining the target object, highlight of which is eliminated, in the visible light image according to the highlight region in the visible light image and the object mask pattern.

Solution 3: The method of solution 2, wherein processing the object region confidence map to obtain the object mask pattern comprises:

performing filtering processing on the object region confidence map based on an adaptive confidence threshold value to obtain the object mask pattern.

Solution 4: The method of solution 3, wherein performing filtering processing on the object region confidence map based on the adaptive confidence threshold value to obtain the object mask pattern comprises:

performing filtering processing on the object region confidence map based on the adaptive confidence threshold value to obtain a binary mask pattern; and performing morphologic processing and guided filtering processing on the binary mask pattern to obtain the object mask pattern.

Solution 5: The method of solution 2, wherein determining the target object, the highlight of which is eliminated, in the visible light image according to the highlight region in the visible light image and the object mask pattern comprises:

performing differential processing on the highlight region in the visible light image and the object mask pattern to obtain the target object in the visible light image.

Solution 6: The method of solution 1, wherein the object detection model comprises an input layer, an intermediate layer and an output layer which are sequentially connected, and inputting the visible light image and the central weight map into the object detection model comprises:

applying the visible light image onto the input layer of the object detection model; and applying the central weight map onto the output layer of the object detection model.

Solution 7: The method of solution 1, further comprising:

acquiring a depth image corresponding to the visible light image, the depth image comprising at least one of a Time Of Flight (TOF) depth image, a binocular depth image or a structured light depth image; and performing registration processing on the visible light image and the depth image to obtain a registered visible light image and depth image for a same scenario, wherein inputting the visible light image and the central weight map into the object detection model to obtain the object region confidence map comprises:

inputting the registered visible light image, the depth image and the central weight map into the object detection model to obtain the object region confidence map, wherein the object detection model is a model obtained by training according to a visible light image, a depth image, a central weight map and a corresponding labeled object mask pattern for a same scenario.

Solution 8: The method of solution 7, further comprising:

after performing registration processing on the visible light image and the depth image to obtain the registered visible light image and depth image for the same scenario, performing normalization processing on pixel values of pixels in the visible light image and pixel values of pixels in the depth image respectively.

Solution 9: The method of solution 8, further comprising:

before performing normalization processing on the pixel values of the pixels in the visible light image and the pixel values of the pixels in the depth image respectively, performing scaling processing on the visible light image and the depth image to obtain a visible light image and a depth image with a preset size, wherein generating the central weight map corresponding to the visible light image comprises:

generating a central weight map with the preset size corresponding to the visible light image with the preset size.

Solution 10: The method of any one of solutions 1 to 9, further comprising:

in response to there are a plurality of objects, determining the target object according to at least one of a priority of a category to which each object belongs, an area occupied by each object or a position of each object.

Solution 11: The method of any one of solutions 1 to 9, further comprising:

in response to it is determined that there are a plurality of objects and all of the plurality of objects are faces, determining whether the plurality of faces are on a same plane; in response to the plurality of faces are on the same plane, determining the plurality of faces as the target object; and in response to the plurality of faces are on different planes, selecting the face having a largest area as the target object.

Solution 12: The method of any one of solutions 7 to 9, wherein a manner of training the object detection model comprises:

acquiring a visible light image, a depth image and a corresponding labeled object mask pattern for a same scenario;

generating a central weight map corresponding to the visible light image, weight values represented by the central weight map gradually decreasing from a center to an edge; and training an object detection model comprising an initial network weight y applying the visible light image onto an input layer of the object detection model comprising the initial network weight, applying the depth image and the central weight map onto an output layer of an initial object detection model and taking the labeled object mask pattern as a ground truth outputted by the object detection model, to obtain a target network weight of the object detection model.

Solution 13: The method of solution 12, wherein a dropout probability of a preset value is used for the depth image in a process of training the object detection model.

Solution 14: A method for training an object detection model, comprising:

acquiring a visible light image, a depth image and a corresponding labeled object mask pattern for a same scenario;

generating a central weight map corresponding to the visible light image, weight values represented by the central weight map gradually decreasing from a center to an edge; and performing training by taking the visible light image, the depth image and the central weight map as an input of an object detection model comprising an initial network weight and taking the labeled object mask pattern as a ground truth outputted by the object detection model comprising the initial network weight, to obtain a target network weight of the object detection model.

Solution 15: The method of solution 14, wherein taking the visible light image, the depth image and the central weight map as the input of the object detection model comprising the initial network weight comprises:

applying the visible light image onto an input layer of the initial object detection model, and applying the depth image and the central weight map onto an output layer of the initial object detection model.

Solution 16: The method of solution 14 or 15, wherein a dropout probability of a preset value is used for the depth image in a process of training the object detection model.

Solution 17: A device for image processing, comprising:

an image acquisition module, configured to acquire a visible light image;

a weight generation module, configured to generate a central weight map corresponding to the visible light image, weight values represented by the central weight map gradually decreasing from a center to an edge;

a detection module, configured to input the visible light image and the central weight map into an object detection model to obtain an object region confidence map, wherein the object detection model is a model obtained by training according to a visible light image, a central weight map and a labeled object mask pattern for a same scenario; and an object determination module, configured to determine a target object in the visible light image according to the object region confidence map.

Solution 18: A device for training an object detection model, comprising:

a training image acquisition module, configured to acquire a visible light image, a depth image and a corresponding object mask pattern for a same scenario;

a training weight generation module, configured to generate a central weight map corresponding to the visible light image, weight values represented by the central weight map gradually decreasing from a center to an edge; and a training module, configured to perform training by taking the visible light image, the depth image and the central weight map as an input of an object detection model comprising an initial network weight and taking the labeled object mask pattern as a ground truth outputted by the object detection model comprising the initial network weight, to obtain a target network weight of the object detection model.

Solution 19: An electronic device, comprising a memory and a processor, wherein a computer program is stored in the memory, and the computer program, when executed by the processor, enables the processor to execute the operations of the method of any one of solutions 1 to 16.

Solution 20: A non-transitory computer-readable storage medium having stored thereon a computer program stored thereon that when executed by a processor, implements the operations of the method of any one of solutions 1 to 16.

A method for image processing and a method for training an object detection model in the at least some embodiments of the disclosure may be applied to an electronic device. The electronic device may be a computer device, a personal digital assistant, a tablet computer, a smart phone, a wearable device or the like, which is provided with a camera. When capturing an image, the camera in the electronic device can performs automatic focusing, to ensure sharpness of the shot image.

In at least some embodiments, the electronic device may include an image processing circuit. The image processing circuit may be implemented by a hardware and/or software component, and may include various processing units for defining an Image Signal Processing (ISP) pipeline. FIG. 1 is a schematic diagram of an image processing circuit according to at least some embodiments. As illustrated in FIG. 1, only various aspects of an image processing technology related to the embodiments of the disclosure are illustrated, for convenient description.

As illustrated in FIG. 1, the image processing circuit may include a first ISP processor 130, a second ISP processor 140 and a control logic 150. A first camera 110 may include one or more first lenses 112 and a first image sensor 114. The first image sensor 114 may include a color filter array (for example, a Bayer filter). The first image sensor 114 may acquire light intensity and wavelength information captured by each imaging pixel of the first image sensor 114, and provide a set of image data which can be processed by the first ISP processor 130. A second camera 120 may include one or more second lenses 122 and a second image sensor 124. The second image sensor 124 may include a color filter array (for example, a Bayer filter). The second image sensor 124 may acquire light intensity and wavelength information captured by each imaging pixel of the second image sensor 124, and provide a set of image data, which can be processed by the second ISP processor 140.

A first image acquired by the first camera 110 is transmitted to the first ISP processor 130 for processing, and the first ISP processor 130, after processing the first image, may send statistical data (for example, brightness of the image, a contrast value of the image and a color of the image) of the first image to the control logic 150. The control logic 150 may determine a control parameter of the first camera 110 according to the statistical data, and the first camera 110 may perform operations of automatic focusing, automatic exposure and the like according to the control parameter. The first image, after being processed by the first ISP processor 130, may be stored in an image memory 160. The first ISP processor 130 may also read an image stored in the image memory 160 for processing. In addition, the first image, after being processed by the ISP processor 130, may be directly sent to a display 170 for displaying, and the display 170 may also read the image in the image memory for displaying.

The first ISP processor 130 may process the image data pixel by pixel in multiple formats. For example, each image pixel may have a bit depth of 8, 10, 12 or 14 bits. The first ISP processor 130 may execute one or more image processing operations on the image data, and collect statistical information about the image data. The image processing operations may be executed according to an accuracy of the same bit depth or different bit depths.

The image memory 160 may be a part of a memory device, a storage device or an independent dedicated memory in the electronic device, and may include a feature of direct memory access (DMA).

Upon receiving image data from an interface of the first image sensor 114, the first ISP processor 130 may execute one or more image processing operations, for example, time-domain filtering. The processed image data may be sent to the image memory 160 for other processing before displaying. The first ISP processor 130 receives the processed data from the image memory 160, and performs image data processing on the processed data in color spaces of RGB and YCbCr. The image data processed by the first ISP processor 130 may be outputted to the display 170, for being viewed by a user and/or for further processing by an image engine or a graphics processing unit (GPU). In addition, output of the first ISP processor 130 may also be sent to the image memory 160, and the display 170 may read the image data from the image memory 160. In at least some embodiments, the image memory 160 may be configured to implement one or more frame buffers.

The statistical data determined by the first ISP processor 130 may be sent to the control logic 150. For example, the statistical data may include statistical information of the first image sensor 114, for example, automatic exposure, automatic white balance, automatic focusing, flashing detection, black level compensation, shading correction of the first lens 112. The control logic 150 may include a processor and/or a microcontroller for executing one or more routines (for example, firmware). The one or more routines may determine the control parameter of the first camera 110 and a control parameter of the first ISP processor 130 according to the received statistical data. For example, the control parameter of the first camera 110 may include a gain, integral time for exposure control, an anti-shake parameter, a flash control parameter, the control parameter (for example, a focal length for focusing or zooming) of the first lens 112 or a combination of these parameters. The control parameter of the first ISP processor 130 may include a gain level and a color correction matrix configured for automatic white balance and color regulation (for example, during RGB processing), and a shading correction parameter of the first lens 112.

Similarly, a second image acquired by the second camera 120 is transmitted to the second ISP processor 140 for processing. The second ISP processor 140, after processing the second image, may send statistical data of the second image (for example, brightness of the image, a contrast value of the image and a color of the image) to the control logic 150, the control logic 150 may determine a control parameter of the second camera 120 according to the statistical data, and the second camera 120 may execute the operations of automatic focusing, automatic exposure and the like according to the control parameter. The second image, after being processed by the second ISP processor 140, may be stored in the image memory 160, and the second ISP processor 140 may also read the image stored in the image memory 160 for processing. In addition, the second image, after being processed by the ISP processor 140, may be directly sent to the display 170 for displaying, and the display 170 may also read the image in the image memory 160 for displaying. The second camera 120 and the second ISP processor 140 may also implement a processing process as described in the first camera 110 and the first ISP processor 130.

In at least some embodiments, the first camera 110 may be a color camera, and the second camera 120 may be a Time Of Flight (TOF) camera or a structured light camera. The TOF camera may acquire a TOF depth image, and the structured light camera may acquire a structured light depth image. Both the first camera 110 and the second camera 120 may be color cameras. A binocular depth image is acquired through the two color cameras. The first ISP processor 130 and the second ISP processor 140 may be a same ISP processor.

The first camera 110 and the second camera 120 photograph the same scenario to obtain a visible light image and a depth image, and send the visible light image and the depth image to the ISP processor. The ISP processor may register the visible light image and the depth image according to a camera calibration parameter, to ensure the visible light image and the depth image are directed to a completely-consistent visual field, and then generate a central weight map corresponding to the visible light image. Weight values represented by the central weight map gradually decrease from a center to an edge of the visible light image. The visible light image and the central weight map are inputted into a trained object detection model to obtain an object region confidence map, and a target object in the visible light image is determined according to the object region confidence map. Alternatively, the visible light image, the depth image and the central weight map are inputted into the trained object detection model to obtain the object region confidence map, and the target object in the visible light image is determined according to the object region confidence map. An object in a center of the image may be detected more easily by using the central weight map, and an object close to the camera may be detected more easily by using the depth image, thereby improving accuracy for object detection.

With the method and device for image processing, the non-transitory computer-readable storage medium and the electronic device according to the embodiments, after the visible light image is acquired and the central weight map corresponding to the visible light image is generated, the visible light image and the central weight map are inputted into the object detection model for detection, to obtain the object region confidence map. The target object in the visible light image is determined according to the object region confidence map. An object in the center of the image can be detected more easily by using the central weight map, and the target object in the visible light image can be recognized more accurately by using the object detection model obtained by training according to the visible light image, the central weight map, the object mask pattern and the like.

Figure 2:
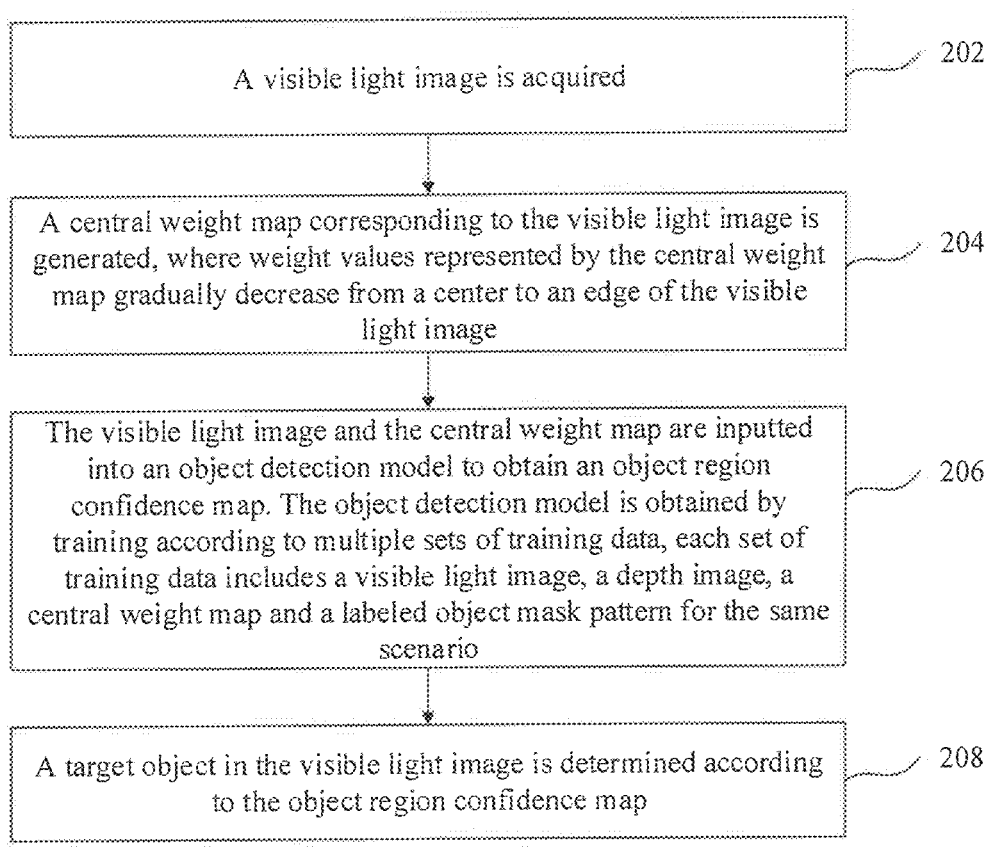
FIG. 2 is a flowchart of a method for image processing according to at least some embodiments.

FIG. 2 is a flowchart of a method for image processing according to at least some embodiments. As illustrated in FIG. 2, the method for image processing may be applied to an electronic device illustrated in FIG. 1, and includes the following operations.

In block 202, a visible light image is acquired.

Object detection refers to automatically processing a region of interest and selectively ignoring a region of no interest in a scenario. The region of interest is called an object region. The visible light image may refer to an RGB image. A color camera may be used to photograph any scenario to obtain a color image, i.e., an RGB image. The visible light image may be locally stored in the electronic device, may also be stored in another device or a network, or may further be captured by the electronic device in real time, which is not limited in the embodiment.

In at least some embodiments, the ISP processor or a central processor of the electronic device may acquire the visible light image locally or from the other device or the network. Alternatively, a scenario is photographed through a camera to obtain the visible light image.

In block 204, a central weight map corresponding to the visible light image is generated. Weight values represented by the central weight map gradually decrease from a center to an edge of the visible light image.

The central weight map refers to a map used for recording a weight value of each pixel in the visible light image. The weight values recorded in the central weight map gradually decrease from the center to four edges of the visible light image. That is, a weight in the center of the visible light image is maximum, and weights gradually decrease from the center to the four edges of the visible light image. The central weight map represents that the weight values gradually decrease from a pixel in the center to pixels at the edge of the visible light image.

The ISP processor or the central processor may generate the central weight map according to a size of the visible light image. The weight values represented by the central weight map gradually decrease from the center to the four edges of the visible light image. The central weight map may be generated by using a Gaussian function, or a first-order equation or a second-order equation. The Gaussian function may be a two-dimensional Gaussian function.

In block 206, the visible light image and the central weight map are inputted into an object detection model to obtain an object region confidence map. The object detection model is obtained by training according to multiple sets of training data. Each set of training data includes a visible light image, a depth image, a central weight map and a corresponding labeled object mask pattern for the same scenario.

The object detection model is obtained by collecting a large amount of training data, and inputting the training data into an object detection model including an initial network weight for training. Each set of training data includes a visible light image, a central weight map and a corresponding labeled object mask pattern corresponding to the same scenario. The visible light image and the central weight map are taken as an input of the trained object detection model, and the labeled object mask pattern is taken as a ground truth expected to be outputted by the trained object detection model. The object mask pattern is an image filter template which may be used for recognizing an object in the image, and may be used to shield other part of the image and screen out the object in the image. The object detection model may be trained to recognize and detect various objects such as a person, a flower, a cat, a dog and a background.

In at least some embodiments, the ISP processor or the central processor may input the visible light image and the central weight map into the object detection model, for performing detection to obtain the object region confidence map. The object region confidence map is configured to record a probability that the object is a certain recognizable object. For example, a probability that a pixel represents a person is 0.8, a probability that the pixel represents a flower is 0.1 and a probability that the pixel represents a background is 0.1.

In block 208, at least one target object in the visible light image is determined according to the object region confidence map.

The object refers to various objects such as a person, a flower, a cat, a dog, a cattle, the blue sky, the white cloud and a background. The target object refers to a required object and may be selected as required.

In at least some embodiments, the ISP processor or the central processor may select a object with the highest confidence or the second highest confidence in the visible light image according to the object region confidence map. If there is only one object, the object is determined as a target object. If there are multiple objects, one or more objects may be selected as required as the target object.

According to the method for image processing in the embodiment, after the visible light image is acquired and the central weight map corresponding to the visible light image is generated, the visible light image and the central weight map may be inputted into the object detection model for detection, to obtain the object region confidence map. The target object in the visible light image may be determined according to the object region confidence map. An object in the center of the image may be detected more easily by using the central weight map, and the target object in the visible light image may be recognized more accurately by using the object detection model obtained by training according to the visible light image, the central weight map, the object mask pattern and the like.

Figure 3:
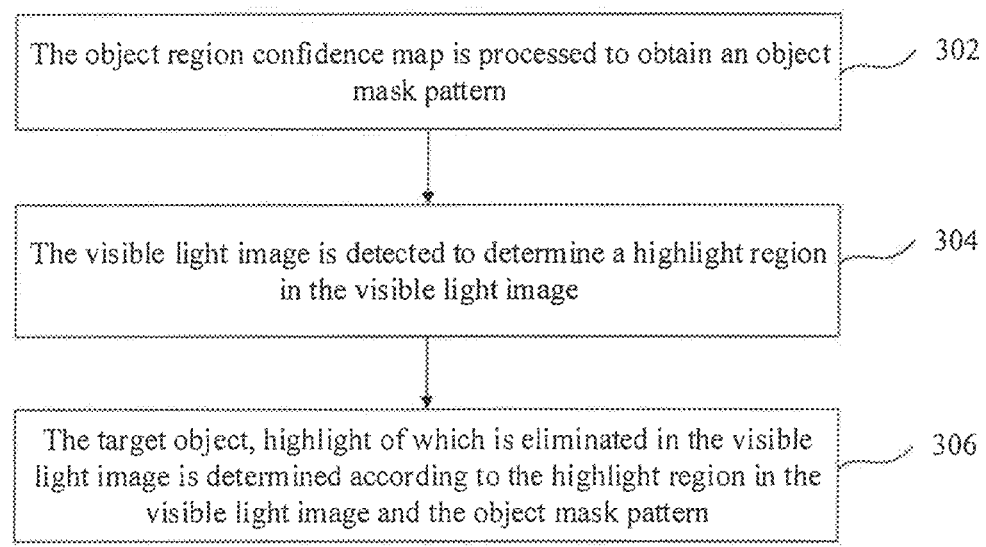
FIG. 3 is a flowchart of determining a target object in a visible light image according to an object region confidence map according to at least some embodiments.

In at least some embodiments, as illustrated in FIG. 3, the operation that the target object in the visible light image is determined according to the object region confidence map includes the following operations.

In block 302, the object region confidence map is processed to obtain an object mask pattern.

In at least some embodiments, some points with low confidences are scattered in the object region confidence map, and the ISP processor or the central processor may perform filtering processing on the object region confidence map to obtain the object mask pattern. Filtering processing may be implemented by configuring a confidence threshold value and filtering out the pixels with confidence values lower than the confidence threshold value in the object region confidence map. The confidence threshold value may be an adaptive confidence threshold value, and may also be a fixed threshold value. Alternatively, threshold values may be configured for different regions.

In block 304, the visible light image is detected to determine a highlight region in the visible light image.

The highlight region refers to a region in which a brightness value is greater than a brightness threshold value.

In at least some embodiments, the ISP processor or the central processor performs highlight detection on the visible light image to screen out a target pixel having a brightness value greater than the brightness threshold value, and performs connected domain processing on the target pixel to obtain the highlight region.

In block 306, the target object, highlight of which is eliminated, in the visible light image is determined according to the highlight region in the visible light image and the object mask pattern.

In at least some embodiments, the ISP processor or the central processor may perform differential calculation or logic AND calculation on the highlight region in the visible light image and the object mask pattern, to obtain the target object, highlight of which is eliminated, in the visible light image.

In at least some embodiments, filtering processing is performed on the object region confidence map to obtain the object mask pattern, to improve reliability of the object region confidence map. The visible light image is detected to obtain the highlight region. The highlight region and the object mask pattern are processed to obtain the target object, highlight of which is eliminated. Highlight and high-brightness regions which affect precision of object recognition are processed independently by using a filter, thereby improving precision and accuracy of the object recognition.

In at least some embodiments, the operation that the object region confidence map is processed to obtain the object mask pattern may include: performing filtering processing on the object region confidence map based on an adaptive confidence threshold value to obtain the object mask pattern.

The adaptive confidence threshold value refers to a confidence threshold value. The adaptive confidence threshold value may be a local-adaptive confidence threshold value. The local-adaptive confidence threshold value is a binary confidence threshold value at a position of a pixel, which is determined according to a distribution of pixel values in a region block of the pixel. A binary confidence threshold value of an image region having high brightness is high, and a binary confidence threshold value of an image region having low brightness is low.

Optionally, a process of configuring the adaptive confidence threshold value may include operations as follows. In response to a brightness value of a pixel is greater than a first brightness value, a first confidence threshold value is configured. In response to the brightness value of the pixel is less than a second brightness value, a second confidence threshold value is configured. In response to the brightness value of the pixel is greater than the second brightness value and less than the first brightness value, a third confidence threshold value is configured. The second brightness value is less than or equal to the first brightness value, the second confidence threshold value is less than the third confidence threshold value, and the third confidence threshold value is less than the first confidence threshold value.

Optionally, the process of configuring the adaptive confidence threshold value may include operations as follows. In response to the brightness value of the pixel is greater than the first brightness value, the first confidence threshold value is configured. In response to the brightness value of the pixel is less than or equal to the first brightness value, the second confidence threshold value is configured. The second brightness value is less than or equal to the first brightness value, and the second confidence threshold value is less than the first confidence threshold value.

When filtering processing is performed on the object region confidence map based on the adaptive confidence threshold value, a confidence value of each pixel in the object region confidence map is compared with the confidence threshold value. If the confidence value is greater than or equal to the confidence threshold value, the pixel is reserved. If the confidence value is less than the confidence threshold value, the pixel is removed.

In at least some embodiments, the operation that filtering processing is performed on the object region confidence map based on the adaptive confidence threshold value to obtain the object mask pattern includes operations as follows.

Filtering processing is performed on the object region confidence map based on the adaptive confidence threshold value, to obtain a binary mask pattern. Morphologic processing and guided filtering processing are performed on the binary mask pattern, to obtain the object mask pattern.

In at least some embodiments, the ISP processor or the central processor, after performing filtering processing on the object region confidence map according to the adaptive confidence threshold value, represents the confidence value of the reserved pixel as 1 and represents the confidence value of the removed pixel as 0, to obtain the binary mask pattern.

Morphologic processing may include erosion and expansion. An erosion operation may be executed on the binary mask pattern at first, and then an expansion operation is executed to remove a noise. Then, guided filtering processing is performed on the binary mask pattern obtained after the morphologic processing, for implementing an edge filtering operation, to obtain an object mask pattern of which an edge is extracted.

By the morphologic processing and the guided filtering processing, it can be ensured that the obtained object mask pattern has few noise or has no noise, and has soft edges.

In at least some embodiments, the operation that the target object, highlight of which is eliminated, in the visible light image is determined according to the highlight region in the visible light image and the object mask pattern may include: performing differential processing on the highlight region in the visible light image and the object mask pattern, to obtain the target object, highlight of which is eliminated.

In at least some embodiments, the ISP processor or the central processor may perform differential processing on the highlight region in the visible light image and the object mask pattern, that is, pixel values in the visible light image and pixel values in the object mask pattern are subtracted, to obtain the target object in the visible light image. The target object, highlight of which is eliminated, is obtained by the differential processing, and a calculation manner is simple.

In at least some embodiments, the object detection model may include an input layer, an intermediate layer and an output layer which are sequentially connected. The operation that the visible light image and the central weight map are inputted into the object detection model may include: applying the visible light image onto the input layer of the object detection model, and applying the central weight map onto the output layer of the object detection model.

The object detection model may adopt a deep learning network model. The deep learning network model may include an input layer, an intermediate layer and an output layer which are sequentially connected. The intermediate layer may be in a network structure of one layer or at least two layers. The visible light image is inputted into the input layer of the object detection model, that is, the visible light image is applied onto the input layer of the object detection model. The central weight map is inputted into the output layer of the object detection model, that is, the central weight map is applied onto the output layer of the object detection model. The central weight map is applied onto the output layer of the object detection model, so that influence of the other layers of the object detection model on the weight map may be reduced, and the object in the center of the image may be detected as an object more easily.

In at least some embodiments, the method for image processing may further include: acquiring a depth image corresponding to the visible light image is acquired, the depth image includes at least one of a TOF depth image, a binocular depth image or a structured light depth image; and performing registration processing on the visible light image and the depth image, to obtain a registered visible light image and a registered depth image for the same scenario.

The depth image refers to an image including depth information. The same scenario is photographed by a depth camera or a binocular camera, to obtain a depth image. The depth camera may be a structured light camera or a TOF camera. The depth image may be at least one of a structured light depth image, a TOF depth image or a binocular depth image.

In at least some embodiments, the ISP processor or the central processor may photograph the same scenario through the camera, to obtain the visible light image and the depth image corresponding to the visible light image, and then register the visible light image and the depth image by using a camera calibration parameter to obtain the registered visible light image and the registered depth image.

In another embodiment, when it is unable to photograph the depth image, a simulated depth image may be automatically generated. A depth value of each pixel in the simulated depth image may be a preset value. In addition, the depth values of the pixels in the simulated depth image may correspond to different preset values.

In at least some embodiments, the operation that the visible light image and the central weight map are inputted into the object detection model to obtain the object region confidence map includes: inputting the registered visible light image, depth image and the central weight map into the object detection model to obtain the object region confidence map. The object detection model is a model obtained by training according to multiple sets of training data. Each set of training set includes the visible light image, the depth image, the central weight map and the corresponding labeled object mask pattern for the same scenario.

The object detection model is obtained by acquiring a large amount of training data and inputting the training data into the object detection model including the initial network weight for training. Each set of training data includes a visible light image, a depth image, a central weight map and a corresponding labeled object mask pattern corresponding to the same scenario. The visible light image and the central weight map are taken as an input of the trained object detection model, and the labeled object mask pattern is taken as a ground truth expected to be outputted by the trained object detection model. The object mask pattern is an image filter template used to recognize an object in the image, and may shield other part of the image and screen out the object in the image. The object detection model may be trained to recognize and detect various objects such as a person, a flower, a cat, a dog and a background.

In the embodiment, the depth image and the central weight map are taken as the input of the object detection model, so that an object close to the camera may be detected more easily by using the depth information of the depth image. The object in the center of the image may be detected more easily since a center-focused mechanism that the weight in the center is high and the weights at the four edges are small in the central weight map. The depth image is used to implement depth feature enhancement on the object, and the central weight map is used to implement center-focused feature enhancement on the object, so that not only a target object in a simple scenario may be accurately recognized, but also accuracy of object recognition in a complex scenario is greatly improved. With the depth image, the problem of poor robustness of a conventional target detection method for various targets of a natural image may be solved. The simple scenario refers to a scenario where there is a single object and a contrast of a background region is not high.

In at least some embodiments, the method may further include: after the operation that registration processing is performed on the visible light image and the depth image to obtain the registered visible light image and the registered depth image for the same scenario performing normalization processing on pixel values of pixels in the visible light image and pixel values of pixels in the depth image respectively.

In at least some embodiments, the pixel values ranging from integers 0 to 255, of the pixels in the visible light image are normalized to floating-point numbers from −1 to +1, and the pixel values of the pixels in the depth image are normalized to floating-point numbers from 0 to 1. When it is unable to photograph the depth image, the simulated depth image of which the depth value is the preset value may be automatically generated. The preset value may be a floating-point number from 0 to 1.

In the embodiment, the pixel values in the visible light image and the pixel values in the depth image are normalized respectively, thereby reducing data amount, and saving processor resources consumed in calculation.

In at least some embodiments, before the operation that the pixel values of the pixels in the visible light image and the pixel values of the pixels in the depth image are normalized respectively, the method may further include: performing scaling processing on the visible light image and the depth image, to obtain a visible light image with a preset size and a depth image with preset size.

The preset size may be set as required. For example, the preset size may be 224*224, or 256*256 and 648*320, which is not limited thereto. The visible light image and the depth image are scaled-down to the preset size, thereby reducing the data amount, improving processing efficiency, and reducing system resource consumption.

Optionally, the operation that the central weight map corresponding to the visible light image is generated may include: generating a central weight map with the preset size corresponding to the visible light image with the preset size.

In response to the visible light image is scaled-down to the preset size, the central weight map generated corresponding to the visible light image is also required to be regulated, to ensure that the weight values represented by the central weight map correspond to the pixels in the visible light image.

In at least some embodiments, the method for image processing may further include: in response to there are multiple objects, determining the target object according to at least one of a priority of a category to which each object belongs, an area occupied by each object or a position of each object.

The category refers to a category to which the object is categorized, for example, categories of a portrait, a flower, an animal and a scenery. The position refers to a position of the object in the visible light image and may be represented with coordinates.

In at least some embodiments, in response to there are multiple objects, the priority of the category to which each object belongs is acquired, and the object with the highest priority or the second highest priority is selected as the target object.

In response to there are multiple objects, the area occupied by each object is acquired, and the object occupying the largest area or the second largest area is selected as the target object.

In response to there are multiple objects, the position of each object is acquired, and the object, the position of which is the closest to a center point of the visible light image is selected as the target object.

In response to the priorities of the categories to which multiple objects belong are identical and the highest priority, the area occupied by each of the multiple objects is acquired, and the object occupying the largest area or the second largest area in the visible light image is selected as the target object.

In response to the priorities of the categories to which multiple objects belong are identical and the highest priority, the area occupied by each of the multiple objects having the identical priorities and the highest priority is acquired, and the object occupying the largest area or the second largest area in the visible light image is selected as the target object.

In response to the priorities of the categories to which multiple objects belong are identical and the highest priority, the position of each of the multiple objects having the identical priorities and the highest priority is acquired, and the object, the position of which is closest to the center point of the visible light image, is selected as the target object.

In response to the priorities of the categories to which multiple objects belong are identical and the highest priority, the area occupied by each of the multiple objects having the identical priorities and the highest priority is acquired. In response to the areas occupied by multiple objects are identical, the positions of the objects occupying identical areas are acquired, and the object, the position of which in the visible light image is the closest to the center point of the visible light image, is selected as the target object.

In response to there are multiple objects, the priority of the category to which the object belongs, the area occupied by the object and the position of the object may be acquired for each object. Screening may be performed according to three dimensions of the priority, the area and the position, and a screening sequence of the priority, the area and the position may be set as required and will not be limited.

In the embodiment, when there are multiple objects, screening is performed according to one or at least two of the priorities of the categories to which the objects belong to, the areas of the objects and the positions of the objects, to determine the target object. In this way, the target object can be accurately determined.

In at least some embodiments, the method for image processing may further include operations as follows.

In response to it is determined that there are multiple objects and all the multiple objects are faces, whether the multiple faces are on the same plane is determined.

In response to the multiple faces are on the same plane, the multiple faces are determined as the target object.

In response to the multiple faces are on different planes, the face having the largest area are selected as the target object.

In at least some embodiments, depth information of each of the multiple faces may be acquired, whether the multiple faces are on the same plane is determined by comparing whether the pieces of depth information of multiple faces are identical. In response to the pieces of depth information are identical, the multiple faces are on the same plane. In response to the pieces of depth information are different, the multiple faces are on different planes. The depth information of the face may be represented with an average value, a median value or a weighted value or the like of depth information of each pixel of a region where the face is located. The depth information of the face may also be obtained by calculation according to a preset function over each pixel of the region where the face is located. The preset function may be a linear function, an exponential function or a power function, etc.

In at least some embodiments, a manner of training the object detection model includes that operations as follows. Multiple sets of training data are acquired. Each set of training data includes a visible light image, a depth image and a corresponding labeled object mask pattern for the same scenario. A central weight map corresponding to the visible light image is generated. Weight values represented by the central weight map gradually decrease from the center to the edge of the visible light image. The object detection model including the initial network weight is trained by applying the visible light image onto the input layer of the object detection model including the initial network weight, applying the depth image and the central weight map onto the output layer of the object detection model including the initial network weight, and taking the labeled object mask pattern as the ground truth outputted by the object detection model including the initial network weight, to obtain a target network weight of the object detection model.

A visible light image, a depth image and a corresponding labeled object mask pattern for a scenario may be acquired. The visible light image and the depth image are semantically labeled to label objects in the visible light image and the depth image. A large number of visible light images may be collected, and then fused based on a foreground target image and a simple background image in a COCO dataset, to obtain a large number of images having a pure-color background or a simple background as training visible light images. The COCO dataset includes a large number of foreground targets.

A network structure of the object detection model is in a mobile-Unet-based architecture, and adds interlayer bridge connection onto a decoder part, so that a high-level semantic feature is fully transferred during upsampling. The central weight map is applied onto the output layer of the object detection model, and the center-focused mechanism is used to make the object in the center of the image easier to be detected as the object.

The network structure of the object detection model may include the input layer, a convolutional layer (conv), a pooling layer (pooling), a bilinear interpolation layer (bilinear up sampling), a convolution feature connection layer (concat+conv), the output layer and the like. A deconvolution+add (deconvolution feature addition) operation is executed to bridge between the bilinear interpolation layer and the convolution feature connection layer, so that the high-level semantic feature is fully transferred during upsampling. The convolutional layer, the pooling layer, the bilinear interpolation layer, the convolution feature connection layer and the like may be intermediate layers of the object detection model.

The initial network weight refers to an initial weight of each layer of the initialized deep learning network model. The target network weight refers to a weight of each layer of the trained deep learning network model capable of detecting the object in the image. The target network weight may be obtained by training for a preset number of times, and a loss function of the deep learning network model may also be set. In response to it is obtained by training that a value of the loss function is less than a loss threshold value, a current network weight of the object detection model is determined as the target network weight.

Figure 4:
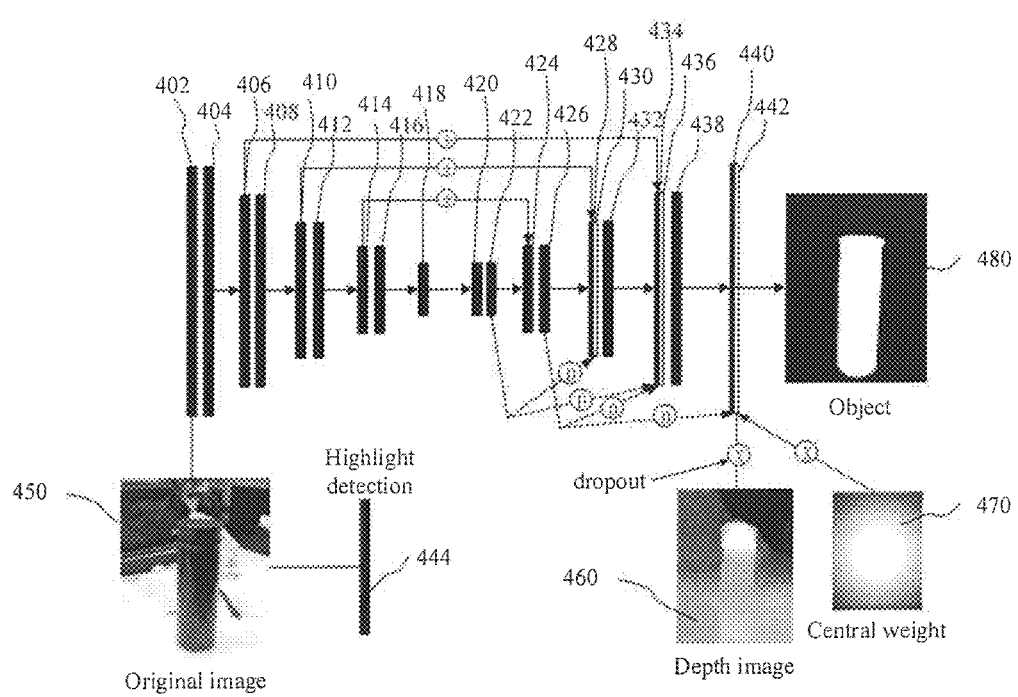
FIG. 4 is a schematic diagram of a network structure of an object detection model according to at least some embodiments.

FIG. 4 is a schematic diagram of a network structure of an object detection model according to at least some embodiments. As illustrated in FIG. 4, the network structure of the object detection model may include a convolutional layer 402, a pooling layer 404, a convolutional layer 406, a pooling layer 408, a convolutional layer 410, a pooling layer 412, a convolutional layer 414, a pooling layer 416, a convolutional layer 418, a convolutional layer 420, a bilinear interpolation layer 422, a convolutional layer 424, a bilinear interpolation layer 426, a convolutional layer 428, a convolution feature connection layer 430, a bilinear interpolation layer 432, a convolutional layer 434, a convolution feature connection layer 436, a bilinear interpolation layer 438, a convolutional layer 440, a convolution feature connection layer 442 and the like. The convolutional layer 402 is an input layer of the object detection model, and the convolution feature connection layer 442 is an output layer of the object detection model. The network structure of the object detection model in the embodiment is only an example and not intended to limit the disclosure. It can be understood that multiple convolutional layers, multiple pooling layers, multiple bilinear interpolation layers, multiple convolution feature connection layers and the like may be set as required in the network structure of the object detection model.

A coding portion of the object detection model may include the convolutional layer 402, the pooling layer 404, the convolutional layer 406, the pooling layer 408, the convolutional layer 410, the pooling layer 412, the convolutional layer 414, the pooling layer 416 and the convolutional layer 418, and a decoding portion includes the convolutional layer 420, the bilinear interpolation layer 422, the convolutional layer 424, the bilinear interpolation layer 426, the convolutional layer 428, the convolution feature connection layer 430, the bilinear interpolation layer 432, the convolutional layer 434, the convolution feature connection layer 436, the bilinear interpolation layer 438, the convolutional layer 440 and the convolution feature connection layer 442. The convolutional layer 406 concatenates with the convolutional layer 434, the convolutional layer 410 concatenates with the convolutional layer 428, and the convolutional layer 414 concatenates with the convolutional layer 424. The bilinear interpolation layer 422 is bridged with the convolution feature connection layer 430 by deconvolution feature addition (deconvolution+add). The bilinear interpolation layer 432 is bridged with the convolution feature connection layer 436 by deconvolution feature addition. The bilinear interpolation layer 438 is bridged with the convolution feature connection layer 442 by deconvolution feature addition.

An original image 450 (for example, a visible light image) is inputted into the convolutional layer 402 of the object detection model, a depth image 460 is applied onto the convolution feature connection layer 442 of the object detection model, and a central weight map 470 is applied onto the convolution feature connection layer 442 of the object detection model. Each of the depth image 460 and the central weight map 470 is inputted into the convolution feature connection layer 442 as a multiplication factor. After the original image 450, the depth image 460 and the central weight map 470 are inputted into the object detection model, a confidence map 480 including an object is outputted.

In a process of training the object detection model, a dropout probability of a preset value is adopted for the depth image. The preset value may be 50%. The dropout probability is used in a process of training the depth image, so that information of the depth image can be fully mined for the object detection model. When the depth image may not be acquired for the object detection model, an accurate result may still be outputted. A dropout manner is adopted for an input of the depth image, so that robustness of the object detection model for the depth image is high, and an object region may be accurately separated even without any depth image.

In addition, since photographing and calculation of a depth image is quite time-consuming and labor-consuming in a normal photographing process of an electronic device and it is difficult to acquire the depth image, the dropout probability of the depth image is set to be 50% during training, which can ensure normal detection of the object detection model even without depth information.

Highlight detection is performed on the original image 450 by using a highlight detection layer 444, to recognize a highlight region in the original image. Filtering processing is performed on an object region confident map outputted by the object detection model based on an adaptive threshold value, to obtain a binary mask pattern. Morphologic processing and guided filtering processing are performed on the binary mask pattern to obtain an object mask pattern. Differential processing is performed on the object mask pattern and the original image including the highlight region, and the highlight region is removed from the object mask pattern to obtain an object, highlight of which is eliminated. The object region confidence map is a confidence map ranging from 0 to 1, the object region confidence map includes more noisy points, and many noisy points have low confidences, or small high-confidence regions are clustered together. Filtering processing is performed based on a region-adaptive confidence threshold value to obtain the binary mask pattern. Morphologic processing is performed on the binary mask pattern to further reduce noise, and guided filtering processing is performed to make an edge smoother. It can be understood that the object region confidence map may be an object mask pattern including noisy points.

In the embodiment, a network output result is enhanced by taking the depth image as a feature, the depth image is not directly inputted into a network of the object detection model. A double deep learning network structure may be additionally designed. One deep learning network structure is configured to process the depth image, the other deep learning network structure is configured to process an RGB image, and convolution feature connection is performed on outputs of the two deep learning network structures for output.

In at least some embodiments, a manner of training the object detection model includes operations as follows. Multiple sets of training data are acquired. Each set of training data includes a visible light image and a corresponding labeled object mask pattern for the same scenario. A central weight map corresponding to the visible light image is generated. Weight values represented by the central weight map gradually decrease from a center to an edge of the visible light image. An object detection model including an initial network weight is trained by applying the visible light image onto an input layer of the object detection model including the initial network weight, applying the central weight map onto an output layer of the object detection model including the initial network weight and taking the labeled object mask pattern as a ground truth outputted by the object detection model including the initial network weight, to obtain a target network weight of the object detection model.

In the embodiment, the visible light image and the central weight map may be used for training. That is, no depth image is applied onto an output layer in the network structure of the object detection model in FIG. 4, the visible light image is applied onto the convolutional layer 402, and the central weight map 470 is applied onto the convolution feature connection layer 442 of the object detection model.

Figure 5:
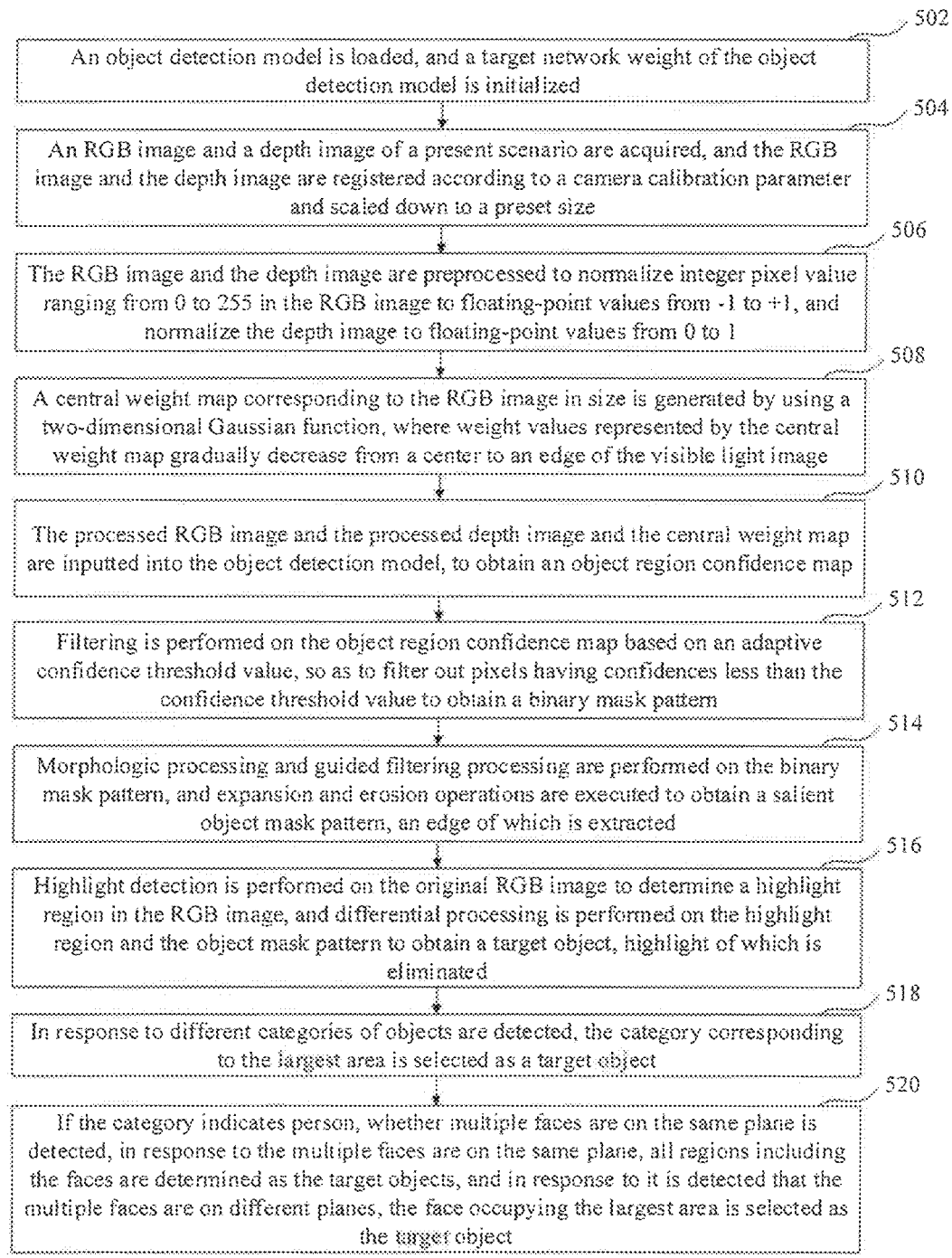
FIG. 5 is a flowchart of applying a method for image processing to detect an object according to at least some embodiments.

FIG. 5 is a flowchart of applying a method for image processing to object detection according to at least some embodiments. As illustrated in FIG. 5, an object detection process includes the following operations.

In block 502, an object detection model is loaded, and a target network weight of the object detection model is initialized.

An ISP processor or a central processor may load a network of the object detection model and initializes the target network weight of the object detection model.

In block 504, an RGB image and a depth image of a current scenario are acquired, and the RGB image and the depth image are registered according to a camera calibration parameter and scaled-down to a preset size.

The preset size may be set as required. For example, the preset size may be 224*224, 256*256 and 64*320. In the embodiment, the RGB image and the depth image are scaled-down to 224*224.

In block 506, the RGB image and the depth image are preprocessed to normalize integer pixel value ranging from 0 to 255 in the RGB image to floating-point values from −1 to +1, and normalize the depth image to floating-point values from 0 to 1.

If it is unable to acquire the depth image, a simulated depth image having a size of 224*224 and a value of 0.7 is automatically generated.

In block 508, a central weight map corresponding to the RGB image in size is generated by using a two-dimensional Gaussian function. Weight values represented by the central weight map gradually decrease from a center to an edge of the visible light image.

In block 510, the processed RGB image and the processed depth image and the central weight map are inputted into the object detection model, to obtain an object region confidence map.

In block 512, filtering is performed on the object region confidence map based on an adaptive confidence threshold value, so as to filter out pixels having confidences less than the confidence threshold value to obtain a binary mask pattern.

In block 514, morphologic processing and guided filtering processing are performed on the binary mask pattern, and expansion and erosion operations are executed to obtain an object mask pattern of which an edge is extracted.

In block 516, highlight detection is performed on the original RGB image to determine a highlight region in the RGB image, and differential processing is performed on the highlight region and the object mask pattern to obtain a target object, highlight of which is eliminated.

In block 518, in response to different categories of objects are detected, the category corresponding to the largest area is selected as a target object.

In block 520, if the category indicates person, whether multiple faces are on the same plane is detected. In response to the multiple faces are on the same plane, all regions including the faces are determined as the target objects. In response to it is detected that the multiple faces are on different planes, the face occupying the largest area is selected as the target object.

According to the method for image processing in the embodiment, when object detection is performed on the RGB image, the depth image and the central weight map are used to implement depth feature enhancement and center-focused feature enhancement, so that an object in a simple scenario, for example, having a single object and a low contrast of a background region, may be accurately separated, and accuracy of target object recognition in a complex scenario is greatly improved. With the depth image, the problem of poor robustness of a conventional detection method for various targets of a natural image may be solved. For highlight and high-brightness regions which influence precision of the object recognition, the highlight region in the RGB image is recognized by highlight detection, and then filtered by an independent filter.

In addition, according to the method for image processing of the disclosure, the object, i.e., object information, in the image is determined with assistance of a deep learning network and the depth image. Recognizing the object in the image may regulate automatic focusing, automatic exposure and automatic white balance strategies more accurately and increase a coding and decoding compression rate.

Figure 6:
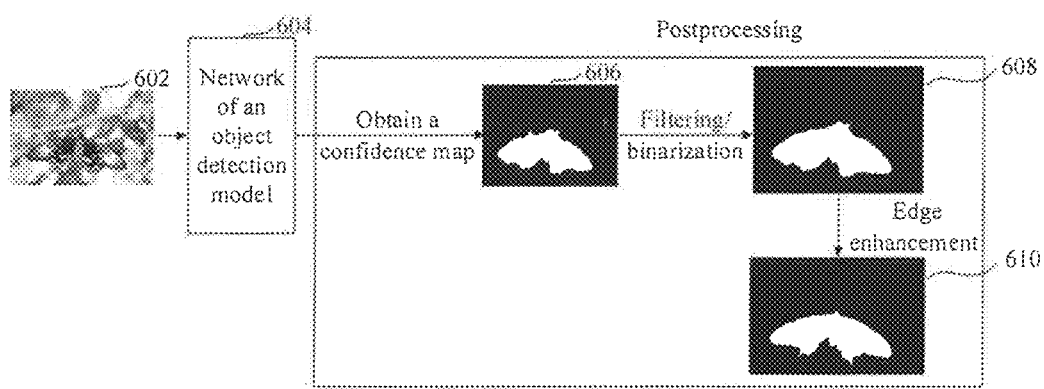
FIG. 6 is a schematic diagram of an image processing effect according to at least some embodiments.

FIG. 6 is a schematic diagram of an image processing effect according to at least some embodiments. As illustrated in FIG. 6, there is a butterfly in an RGB image 602. The RGB image is inputted into an object detection model to obtain an object region confidence map 604. Filtering and binarization processing is performed on the object region confidence map 604, to obtain a binary mask pattern 606. Morphologic processing and guided filtering processing are performed on the binary mask pattern 606 to implement edge enhancement to obtain an object mask pattern 608.

Figure 7:
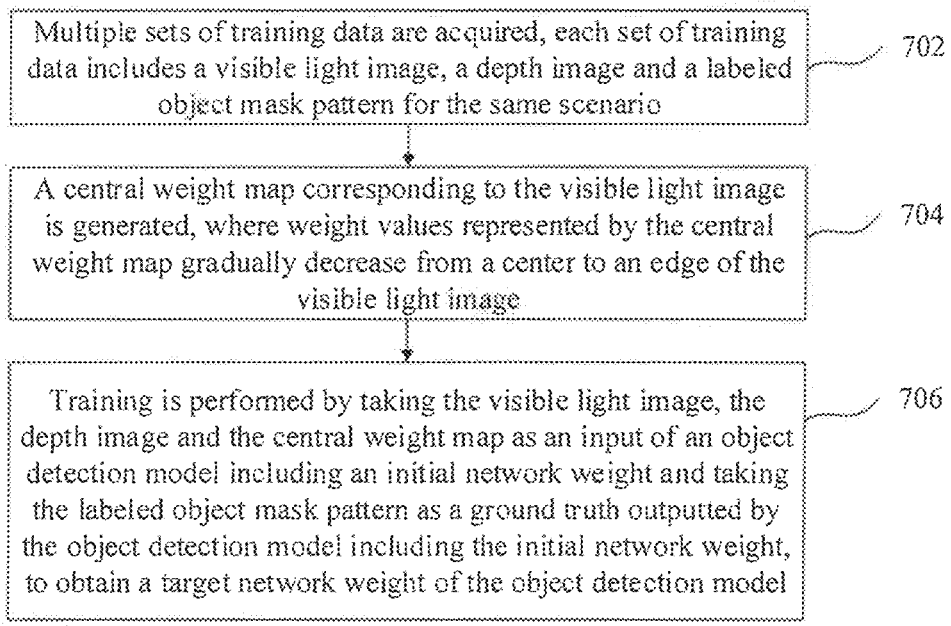
FIG. 7 is a flowchart of a method for training an object detection model according to at least some embodiments.

FIG. 7 is a flowchart of a method for training an object detection model according to at least some embodiments. As illustrated in FIG. 7, the method for training the object detection model includes the following operations.

In block 702, multiple sets of training data are acquired, each set of training data includes a visible light image, a depth image and a corresponding labeled object mask pattern for the same scenario.

The visible light image, the depth image and the corresponding labeled object mask pattern for the scenario may be acquired. A large number of visible light images may be collected and then fused based on a foreground target image and a simple background image in a COCO dataset, to obtain a large number of images having a pure color background or a simple background as training visible light images. The labeled object mask pattern includes a correctly labeled target object.

In block 704, a central weight map corresponding to the visible light image is generated. Weight values represented by the central weight map gradually decrease from a center to an edge of the visible light image.

In block 706, training is performed by taking the visible light image, the depth image and the central weight map as an input of an object detection model including an initial network weight and taking the labeled object mask pattern as a ground truth outputted by the object detection model including the initial network weight, to obtain a target network weight of the object detection model.

The object detection model may be a deep learning network model, and the initial network weigh may be a network weight value of the deep learning network model.

When a loss function is less than a loss threshold value or the number of training reaches a preset number, the target network weight of the object detection model is obtained.

The loss threshold value may be set as required. For example, the loss threshold is 0.01 and 0.02, but it is not limited thereto. The preset number may be set as required. For example, the preset number is 10,000 and 1,000, but it is not limited thereto. The target network weight is a weight value of each network layer of the trained object detection model.

In the embodiment, in a process of training the object detection model, the depth image is used for depth feature enhancement, the central weight map is used for center-focused feature enhancement. Therefore, an object close to a camera is detected as an object more easily by using a depth feature enhancement mechanism, and an object in the center of the image is detected as an object more easily by using a center-focused feature enhancement mechanism. In this way, an object in a simple scenario may be accurately separated, and accuracy of object recognition in a complex scenario is greatly improved. In addition, with introducing the depth image into the object detection model, the problem of poor robustness for various target of a natural image may be solved, thereby accurately recognizing a target object.

In at least some embodiments, the operation that the visible light image, the depth image and the central weight map are taken as an input of the object detection model including the initial network weight may include: applying the visible light image onto an input layer of the initial object detection model, and applying the depth image and the central weight map on an output layer of the initial object detection model. The depth image and the central weight map are directly applied onto the output layer of the object detection model for implementing depth feature enhancement and center-focused feature enhancement, and are not inputted into a network of the object detection model, so that calculation is simple and recognition is accurate.

In at least some embodiments, in a process of training the object detection model, a dropout probability of a preset value is adopted for the depth image. The preset value may be 50%. The dropout probability is used in a process of training the depth image, so that information of the depth image can be fully mined for the object detection model. When the depth image may not be acquired for the object detection model, an accurate result may still be outputted. A dropout manner is adopted for an input of the depth image, so that robustness of the object detection model for the depth image is high, and an object region may be accurately separated even without any depth image. It can be understood that each operation in the flowcharts in FIG. 2, FIG. 3, FIG. 5 and FIG. 7 is sequentially displayed according to indication of the arrowheads, but it is unnecessary that these operations are sequentially executed according to the sequences indicated by the arrowheads. Unless otherwise clearly described in the disclosure, execution sequences of these operations are not limited strictly, and these operations may be executed in other sequences. Moreover, at least part of operations in FIG. 2, FIG. 3, FIG. 5 and FIG. 7 may include multiple sub-operations or multiple stages, these sub-operations or stages are unnecessarily executed and implemented at the same time but may be executed at different times, and these sub-operations or stages are unnecessarily sequentially executed but may be executed in turn or alternately with at least part of other operations or sub-operations or stages.

Figure 8:
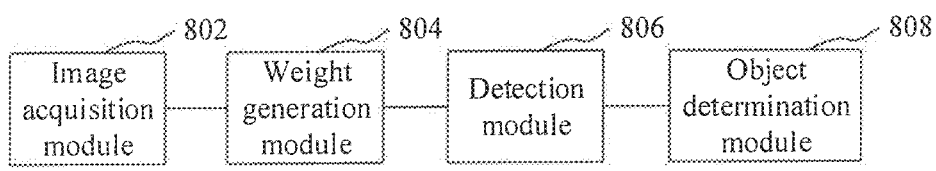
FIG. 8 is a structural block diagram of a device for image processing according to at least some embodiments.

FIG. 8 is a structural block diagram of a device for image processing according to at least some embodiments. As illustrated in FIG. 8, the device for image processing includes an image acquisition module 802, a weight generation module 804, a detection module 806 and an object determination module 808.

The image acquisition module 802 may be configured to acquire a visible light image.

The weight generation module 804 may be configured to generate a central weight map corresponding to the visible light image. Weight values represented by the central weight map gradually decrease from a center to an edge of the visible light image.

The detection module 806 may be configured to input the visible light image and the central weight map into an object detection model to obtain an object region confidence map. The object detection model is a model obtained by training according to multiple sets of training data, each set of training data includes a visible light image, a central weight map and a corresponding labeled object mask pattern for the same scenario.

The object determination module 808 may be configured to determine a target object in the visible light image according to the object region confidence map.

According to the device for image processing in the embodiment, after the visible light image is acquired and the central weight map corresponding to the visible light image is generated, the visible light image and the central weight map may be inputted into the object detection model for detection, to obtain the object region confidence map. The target object in the visible light image may be determined according to the object region confidence map. An object in the center of the image may be detected more easily by using the central weight map, and the target object in the visible light image may be recognized more accurately by using the object detection model obtained by training according to the visible light image, the central weight map, the object mask pattern and the like.

In at least some embodiments, the object determination module 808 may be further configured to: process the object region confidence map to obtain an object mask pattern; detect the visible light image to determine a highlight region in the visible light image; and determine the target object, highlight of which is eliminated, in the visible light image according to the highlight region in the visible light image and the object mask pattern.

In at least some embodiments, the object determination module 808 may be further configured to perform filtering processing on the object region confidence map based on an adaptive confidence threshold value, to obtain the object mask pattern.

In at least some embodiments, the object determination module 808 may be further configured to: perform filtering processing on the object region confidence map based on the adaptive confidence threshold value to obtain a binary mask pattern; and perform morphologic processing and guided filtering processing on the binary mask pattern to obtain the object mask pattern.

In at least some embodiments, the object determination module 808 may be further configured to perform differential processing on the highlight region in the visible light image and the object mask pattern, to obtain the target object in the visible light image.

In at least some embodiments, the object detection model includes an input layer, an intermediate layer and an output layer which are sequentially connected.

The detection module 806 may be further configured to apply the visible light image onto the input layer of the object detection model and apply the central weight map onto the output layer of the object detection model.

In at least some embodiments, the image acquisition module 802 may be further configured to: acquire a depth image corresponding to the visible light image, the depth image including at least one of a TOF depth image, a binocular depth image or a structured light depth image; and perform registration processing on the visible light image and the depth image to obtain a registered visible light image and a registered depth image for the same scenario.

The detection module 804 may be further configured to input the registered visible light image, the depth image and the central weight map into the object detection model to obtain the object region confidence map. The object detection model is obtained by training according to multiple sets of training data. Each set of training data includes a visible light image, a depth image, a central weight map and a corresponding labeled object mask pattern for the same scenario.

Figure 9:
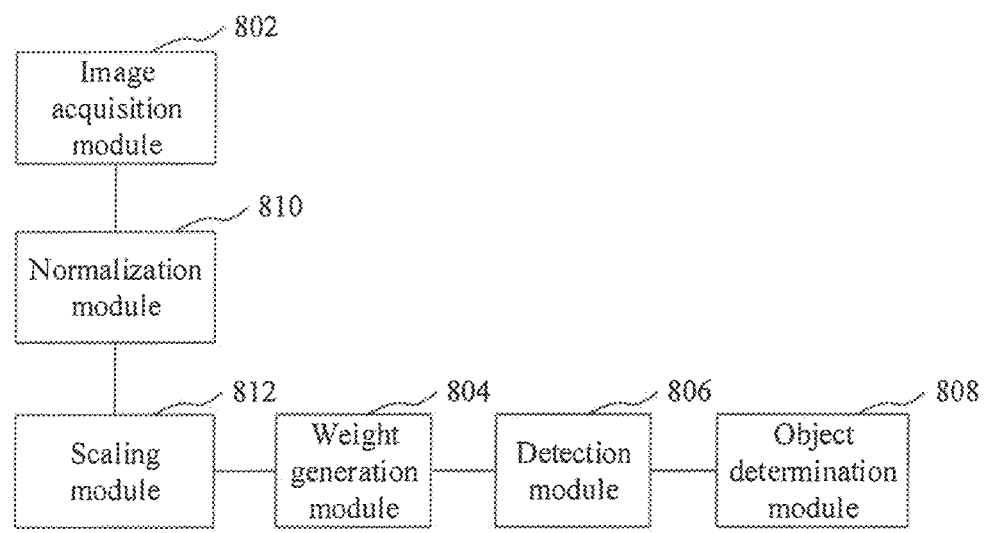
FIG. 9 is a structural block diagram of a device for image processing according to at least some embodiments.

In at least some embodiments, as illustrated in FIG. 9, the device for image processing may further include a normalization module 810 and a scaling module 812.

The normalization module 810 may be configured to, after the image acquisition module performs registration processing on the visible light image and the depth image to obtain the registered visible light image and depth image for the same scenario, perform normalization processing on pixel values of pixels in the visible light image and pixel values of pixels in the depth image respectively.

In at least some embodiments, the scaling module 812 may be configured to, before the normalization processing is performed on the pixel values of the pixels in the visible light image and the pixel values of the pixels in the depth image respectively, perform scaling processing on the visible light image and the depth image to obtain a visible light image with the preset size and a depth image with the preset size.

The weight generation module 804 may be further configured to generate a central weight map with the preset size corresponding to the visible light image with the preset size.

In at least some embodiments, the object determination module 808 may be further configured to, when there are multiple objects, determine the target object according to at least one of a priority of a category to which each object belongs, an area occupied by each object or a position of each object.

In at least some embodiments, the object determination module 808 may be further configured to: in response to it is determined that there are multiple objects and all of the multiple objects are faces, determine whether the multiple faces are on the same plane; in response to the multiple faces are on the same plane, determine the multiple faces as the target object; and in response to the multiple faces are on different planes, select the face with the largest area as the target object.

In at least some embodiments, the device for image processing may further include a training image acquisition module, a training weight generation module and a training module.

The training image acquisition module may be configured to acquire multiple sets of training data. Each set of training set includes the visible light image, the depth image and the corresponding labeled object mask pattern for the same scenario.

The training weight generation module may be configured to generate the central weight map corresponding to the visible light image. Weight values represented by the central weight map gradually decrease from a center to an edge of the visible light image.

The training module may be configured to train the object detection model including the initial network weight by applying the visible light image onto an input layer of the object detection model including the initial network weight, applying the depth image and the central weight map onto an output layer of the object detection model including the initial network weight and taking the labeled object mask pattern as the ground truth outputted by the object detection model including the initial network weight, to obtain the target network weight of the object detection model. In response to a loss function of the object detection model is less than a loss threshold value or the number of training reaches a preset number, a network weight of the object detection model is determined as the target network weight of the object detection model.

In at least some embodiments, a dropout probability of a preset value is used for the depth image in a process of training the object detection model.

Figure 10:
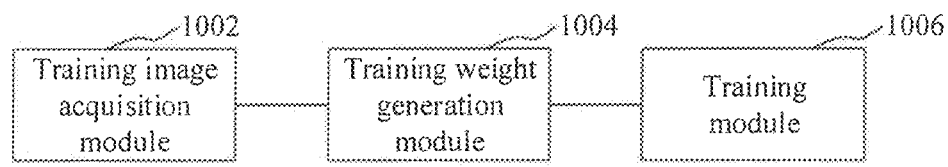
FIG. 10 is a structural block diagram of a device for training an object detection model according to at least some embodiments.

FIG. 10 is a structural block diagram of a device for training an object detection model according to at least some embodiments. As illustrated in FIG. 10, the device for training the object detection model may include a training image acquisition module 1002, a training weight generation module 1004 and a training module 1006.

The training image acquisition module 1002 may be configured to acquire multiple sets of training data. Each set of training data includes a visible light image, a depth image and a corresponding labeled object mask pattern for the same scenario.

The training weight generation module 1004 may be configured to generate a central weight map corresponding to the visible light image. Weight values represented by the central weight map gradually decrease from a center to an edge of the visible light image.

The training module 1006 may be configured to perform training by taking the visible light image, the depth image and the central weight map as an input of an object detection model including an initial network weight and taking the labeled object mask pattern as a ground truth outputted by the object detection model including the initial network weight, to obtain a target network weight of the object detection model. In response to a loss function is less than a loss threshold value or the number of training reaches a preset number, the target network weight of the object detection model is obtained.

In the embodiment, in a process of training the object detection model, the depth image is used for depth feature enhancement, the central weight map is used for center-focused feature enhancement. Therefore, an object close to a camera is detected as an object more easily by using a depth feature enhancement mechanism, and an object in the center of the image is detected as an object more easily by using a center-focused feature enhancement mechanism. In this way, an object in a simple scenario may be accurately separated, and accuracy of object recognition in a complex scenario is greatly improved. In addition, with introducing the depth image into the object detection model, the problem of poor robustness for various targets of a natural image may be solved, thereby accurately recognizing a target object.

In at least some embodiments, the training module 1006 may be further configured to: apply the visible light image onto an input layer of the initial object detection model, and apply the depth image and the central weight map onto an output layer of the initial object detection model.

In at least some embodiments, a dropout probability of a preset value is adopted for the depth image in a process of training the object detection model.

Figure 11:
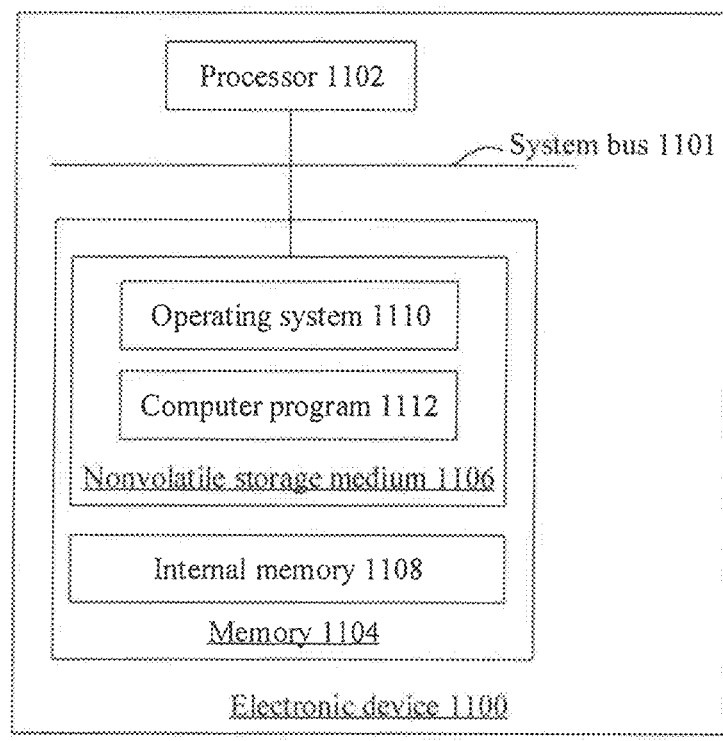
FIG. 11 is an internal structural block diagram of an electronic device according to at least some embodiments.

FIG. 11 is an internal structural diagram of an electronic device according to at least some embodiments. As illustrated in FIG. 11, the electronic device 1100 includes a processor 1102 and memory 1104 which are connected through a system bus. The processor 1102 is configured to provide a calculation and control capability to support running of the whole electronic device 1100. The memory 1104 includes a nonvolatile storage medium 1106 and an internal memory 1108. The nonvolatile storage medium 1106 stores an operating system 1110 and a computer program 1112. The computer program may be executed by the processor 1102 to implement a method for image processing and a method for training an object detection model provided in each of the following embodiments. The internal memory 1108 is a running environment in the nonvolatile storage medium for providing a high-speed cache to an operating system and a computer program. The electronic device 1100 may be a mobile phone, a tablet computer, a personal digital assistant, a wearable device or the like.

Each module in the device for image processing and the device for training an object detection model in the embodiments of the disclosure may be implemented in form of a computer program. The computer program may be run in a terminal or a server. The program module formed by the computer program may be stored in a memory of the terminal or the server. The computer programs are executed by the processor to implement the operations of the methods described in the embodiments of the disclosure.

A non-transitory computer-readable storage medium is further provided according to at least some embodiments of the disclosure. One or more nonvolatile computer-readable storage media including computer-executable instructions are provided. The computer-executable instructions, when being executed by one or more processors, enable the processors to execute the operations of the method for image processing or the method for training an object detection model.

A computer program product including an instruction is further provided according to at least some embodiments of the disclosure, when being run in a computer, enables the computer to execute the operations of the method for image processing or the method for training an object detection model.

Any citation of a memory, a storage, a database or another medium used in the embodiments of the disclosure may include nonvolatile memories and/or nonvolatile memories. A proper nonvolatile memory may include a Read-Only Memory (ROM), a Programmable ROM (PROM), an Electrically Programmable ROM (EPROM), an Electrically Erasable Programmable ROM (EEPROM) or a flash memory. The volatile memory may include a Random Access Memory (RAM), and is used as an external high-speed buffer memory. Exemplarily but unlimitedly, the RAM may be obtained in various forms. For example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Rambus Direct RAM (RDRAM), a Direct RDRAM (DRDRAM) and a Rambus Dynamic RAM (RDRAM).

The abovementioned embodiments only illustrate some implementation modes of the disclosure and are described in detail. However, the abovementioned embodiments are not understood as limits to the patent scope of the disclosure. It is to be pointed out that those skilled in the art may further make multiple transformations and improvements without departing from the concept of the disclosure, and all of these fall within the protection scope of the disclosure. Therefore, the protection scope of the disclosure should conform to the appended claims.

The invention claimed is:

1. A method for image processing, comprising:
acquiring a visible light image;
generating a central weight map corresponding to the visible light image, weight values represented by the central weight map gradually decreasing from a center to an edge of the visible light image;
inputting the visible light image and the central weight map into an object detection model to obtain an object region confidence map, wherein the object detection model is a model obtained by training according to a plurality of sets of training data, and each set of training data comprises a visible light image, a central weight map and a corresponding labeled object mask pattern for a same scenario; and
determining at least one target object in the visible light image according to the object region confidence map.

2. The method of claim 1, wherein the object detection model comprises an input layer, an intermediate layer and an output layer which are sequentially connected, and inputting the visible light image and the central weight map into the object detection model comprises:
applying the visible light image onto the input layer of the object detection model; and
applying the central weight map onto the output layer of the object detection model.

3. The method of claim 1, further comprising:
in response to there are a plurality of objects, determining the at least one target object according to at least one of a priority of a category to which each object belongs, an area occupied by each object or a position of each object.

4. The method of claim 1, further comprising:
in response to it is determined that there are a plurality of objects and all of the plurality of objects are faces, determining whether the plurality of faces are on a same plane;
in response to the plurality of faces are on the same plane, determining the plurality of faces as the at least one target object; and
in response to the plurality of faces are on different planes, selecting the face having a largest area as the at least one target object.

5. The method of claim 4, wherein determining whether the plurality of faces are on a same plane comprises:
acquiring depth information of each of the plurality of faces;
comparing whether the pieces of depth information of the plurality of faces are identical; and
determining that the plurality of faces are on the same plane when the pieces of depth information are identical.

6. The method of claim 1, further comprising:
acquiring a depth image corresponding to the visible light image, the depth image comprising at least one of a Time Of Flight (TOF) depth image, a binocular depth image or a structured light depth image; and
performing registration processing on the visible light image and the depth image to obtain a registered visible light image and a registered depth image for a same scenario,
wherein inputting the visible light image and the central weight map into the object detection model to obtain the object region confidence map comprises:
inputting the registered visible light image, the registered depth image and the central weight map into the object detection model to obtain the object region confidence map, wherein the object detection model is a model obtained by training according to a visible light image, a depth image, a central weight map and a corresponding labeled object mask pattern for a same scenario.

7. The method of claim 6, further comprising:
after performing registration processing on the visible light image and the depth image to obtain the registered visible light image and the registered depth image for the same scenario, performing normalization processing on pixel values of pixels in the visible light image and pixel values of pixels in the depth image respectively.

8. The method of claim 7, further comprising:
before performing normalization processing on the pixel values of the pixels in the visible light image and the pixel values of the pixels in the depth image respectively, performing scaling processing on the visible light image and the depth image to obtain a visible light image with a preset size and a depth image with a preset size, wherein generating the central weight map corresponding to the visible light image comprises:
generating a central weight map with the preset size corresponding to the visible light image with the preset size.

9. The method of claim 6, wherein a manner of training the object detection model comprises:
acquiring a plurality of sets of training data, each set of training data comprising a visible light image, a depth image and a corresponding labeled object mask pattern for a same scenario;
generating a central weight map corresponding to the visible light image, weight values represented by the central weight map gradually decreasing from a center to an edge of the visible light image; and
training an object detection model comprising an initial network weight by applying the visible light image onto an input layer of the object detection model comprising the initial network weight, applying the depth image and the central weight map onto an output layer of the object detection model comprising the initial network weight and taking the labeled object mask pattern as a ground truth outputted by the object detection model comprising the initial network weight, to obtain a target network weight of the object detection model.

10. The method of claim 9, wherein a dropout probability of a preset value is used for the depth image in a process of training the object detection model.

11. The method of claim 1, wherein determining the at least one target object in the visible light image according to the object region confidence map comprises:
processing the object region confidence map to obtain an object mask pattern;
detecting the visible light image to determine a highlight region in the visible light image; and
determining the at least one target object, highlight of which is eliminated, in the visible light image according to the highlight region in the visible light image and the object mask pattern.

12. The method of claim 11, wherein determining the at least one target object, the highlight of which is eliminated, in the visible light image according to the highlight region in the visible light image and the object mask pattern comprises:
performing differential processing on the highlight region in the visible light image and the object mask pattern to obtain the at least one target object in the visible light image.

13. The method of claim 11, wherein processing the object region confidence map to obtain the object mask pattern comprises:
performing filtering processing on the object region confidence map based on an adaptive confidence threshold value to obtain the object mask pattern.

14. The method of claim 13, wherein performing filtering processing on the object region confidence map based on the adaptive confidence threshold value to obtain the object mask pattern comprises:
performing filtering processing on the object region confidence map based on the adaptive confidence threshold value to obtain a binary mask pattern; and
performing morphologic processing and guided filtering processing on the binary mask pattern to obtain the object mask pattern.

15. The method of claim 14, wherein the morphologic processing comprises an expansion operation and an erosion operation.

16. A method for training an object detection model, comprising:
acquiring a plurality of sets of training data, each set of training data comprising a visible light image, a depth image and a corresponding labeled object mask pattern for a same scenario;
generating a central weight map corresponding to the visible light image, weight values represented by the central weight map gradually decreasing from a center to an edge of the visible light image; and
performing training by taking the visible light image, the depth image and the central weight map as an input of an object detection model comprising an initial network weight and taking the labeled object mask pattern as a ground truth outputted by the object detection model comprising the initial network weight, to obtain a target network weight of the object detection model.

17. The method of claim 16, wherein taking the visible light image, the depth image and the central weight map as the input of the object detection model comprising the initial network weight comprises:
applying the visible light image onto an input layer of the object detection model comprising the initial network weight, and applying the depth image and the central weight map onto an output layer of the object detection model comprising the initial network weight.

18. The method of claim 16, wherein a dropout probability of a preset value is used for the depth image in a process of training the object detection model.

19. A device for image processing, comprising:
a processor; and
a memory having stored thereon a computer program, the computer program, when executed by the processor, enables the processor to implement operations of:
acquiring a visible light image;
generating a central weight map corresponding to the visible light image, weight values represented by the central weight map gradually decreasing from a center to an edge of the visible light image;
inputting the visible light image and the central weight map into an object detection model to obtain an object region confidence map, wherein the object detection model is a model obtained by training according to a plurality of sets of training data, and each set of training data comprises a visible light image, a central weight map and a labeled object mask pattern for a same scenario; and
determining at least one target object in the visible light image according to the object region confidence map.

20. The device of claim 19, wherein the computer program, when executed by the processor, enables the processor to further implement operations of:
processing the object region confidence map to obtain an object mask pattern;
detecting the visible light image to determine a highlight region in the visible light image; and
determining the at least one target object, highlight of which is eliminated, in the visible light image according to the highlight region in the visible light image and the object mask pattern.

* * * * *